United States Patent [19]

Freeman

[11] Patent Number: 5,289,168
[45] Date of Patent: Feb. 22, 1994

[54] IMAGE HANDLING APPARATUS AND CONTROLLER FOR SELECTING DISPLAY MODE

[75] Inventor: Stephen Freeman, Bedfordshire, England

[73] Assignee: Crosfield Electronics Ltd., United Kingdom

[21] Appl. No.: 644,654

[22] Filed: Jan. 23, 1991

[30] Foreign Application Priority Data

Jan. 23, 1990 [GB] United Kingdom ............... 9001514

[51] Int. Cl.5 .............................................. G09G 1/06
[52] U.S. Cl. ..................................... 345/121; 345/123; 345/127; 345/145
[58] Field of Search ............... 340/709, 706, 712, 731, 340/721, 724, 726, 725; 178/18; 382/21, 22, 47, 24

[56] References Cited

U.S. PATENT DOCUMENTS

| | | | |
|---|---|---|---|
| 4,313,113 | 1/1982 | Thornburg | 340/709 |
| 4,622,641 | 11/1986 | Stephens | 340/709 |
| 4,698,625 | 10/1987 | McCaskill et al. | 340/709 |
| 4,720,703 | 1/1988 | Schnarel, Jr. et al. | 340/709 |
| 4,972,496 | 11/1990 | Sklarew | 382/13 |
| 4,983,786 | 1/1991 | Stevens et al. | 178/18 |
| 5,075,673 | 12/1991 | Yanker | 340/709 |

FOREIGN PATENT DOCUMENTS

| | | |
|---|---|---|
| 0162300 | 11/1985 | European Pat. Off. . |
| 0403054 | 12/1990 | European Pat. Off. . |
| 1-306916 | 12/1989 | Japan . |
| 0077092 | 3/1990 | Japan ..................... 340/709 |
| 2116407 | 9/1983 | United Kingdom . |
| 2133957 | 8/1984 | United Kingdom . |
| 2139762 | 11/1984 | United Kingdom ............... 340/710 |
| 2219422 | 12/1989 | United Kingdom . |

OTHER PUBLICATIONS

European Search Report, Dated Mar. 30, 1993.

Primary Examiner—Howard W. Britton
Assistant Examiner—A. Au
Attorney, Agent, or Firm—Sughrue, Mion, Zinn, Macpeak & Seas

[57] ABSTRACT

Image handling apparatus comprises a store (22) for storing digital data defining an image; a monitor (30) connected to the store for displaying the image; a control system (1,2) for controlling the image display; and a digitizing tablet (5) defining an area corresponding to the area of the image displayed on the monitor (30) and a pen (31) moveable across the tablet (5). The control system (1,2) is responsive to movement of the pen (31) beyond the monitor display defining area of the tablet (5) to change the manner in which the image is displayed (e.g. scroll, zoom etc.)

8 Claims, 4 Drawing Sheets

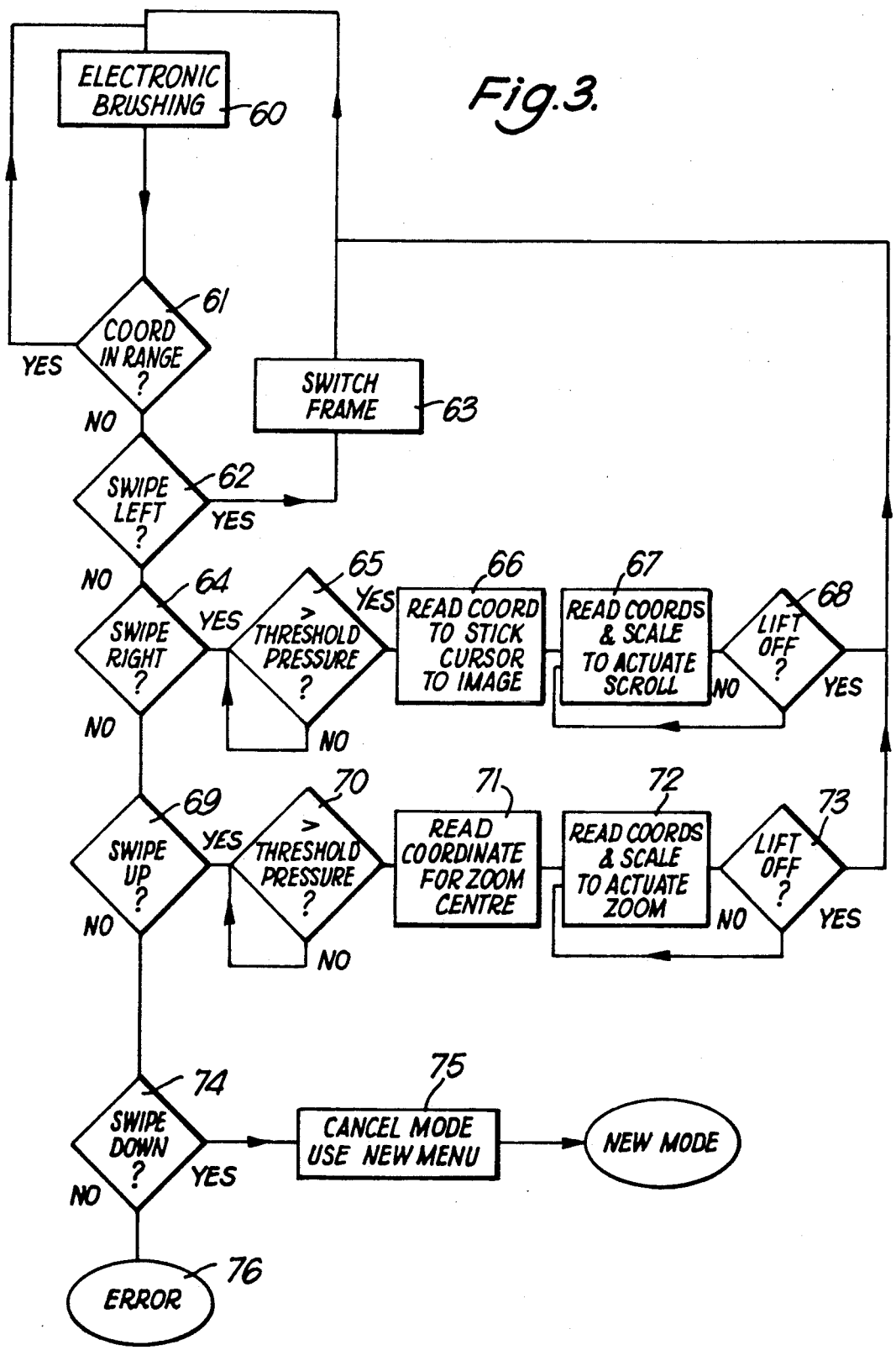

ment, each of these is associated with a particular direction of movement of the indicating device.

Preferably, where the control means can cause the image to scroll across the monitor display, the "swipe off" initiates a scroll mode and thereafter the control means causes the scroll movement to correspond to the subsequent movement of the indicating device across the position defining means.

In the case of the zoom function, the control means may monitor direction of subsequent movement of the indicating device and translate this into zoom (or shrink) factors. It should be understood that "zoom" is intended to mean both enlargement and contraction.

Typically the position defining means will comprise a digitizing tablet of conventional form and the indicating device will comprise a pen (active or non-active).

Although the invention may be used to assist in the retouching or rearrangement of images which have been derived from an electronic input scanner (such as the Crosfield Magnascan System), it is particularly applicable to image creation systems in which the operator "paints" an image electronically by moving the indicating device relative to the position defining means.

IMAGE HANDLING APPARATUS AND CONTROLLER FOR SELECTING DISPLAY MODE

FIELD OF THE INVENTION

The invention relates to image handling apparatus, for example, image creation apparatus in which an operator creates an image by electronically painting, or apparatus for modifying a previously created image which may have been generated by an electronic input scanner or the like.

DESCRIPTION OF THE PRIOR ART

It is common in such apparatus for an image which is being created or modified to be larger than the monitor screen on which the image is displayed. This may be due to the total number of pixels in the image or due to the fact that the image has been enlarged (zoomed). In either event, it is common for the operator to wish to zoom or further zoom the image or to scroll the image relative to the monitor screen so as to view other parts of the image. Conventionally, this is achieved by selecting an appropriate option from a menu, or in a status line and then indicating the amount of zoom or scroll required.

This method of achieving the zoom or scroll selection is undesireable since it requires there to be a break in the creation or retouching operation while a menu is selected and then the appropriate part of the menu selected before the final scroll or zoom operation can be performed, or in the case of fixed status bars, moving the cursor carefully onto the appropriate "button".

SUMMARY OF THE INVENTION

In accordance with the present invention, image handling apparatus comprises a store for storing digital data defining an image; a monitor connected to the store for displaying the image; control means for controlling the image display; and indicating means including a position defining means defining an area corresponding to the area of image displayed on the monitor and an indicating device moveable across the position defining means, the indicating means determining the position of the indicating device relative to the position defining means to indicate corresponding parts of the displayed image, wherein the control means is responsive to movement of the indicating device beyond the monitor display defining area of the position defining means to change the manner in which the image is displayed.

We have devised a new type of apparatus in which a simple "swipe-off" movement of the indicating device automatically causes a change in the manner in which the image is displayed. This means that very little change in movement of the indicating device is required from a normal retouching or image creation movement thus providing continuity to the operator without the need for the intervention of menus or change in any currently displayed menus.

Preferably, the control means can cause the image to be displayed in a number of different manners, each manner being selected in accordance with the direction of movement of the indicating device.

Examples of image display manners which are contemplated include scroll (in which the image is moved across the screen), zoom (in which the image is enlarged) and the ability to switch between foreground and background image frames. In the preferred arrange-

BRIEF DESCRIPTION OF THE DRAWINGS

An example of image handling apparatus according to the invention will now be described with reference to the accompanying drawings, in which:

FIG. 3 is a flow diagram illustrating operation of the apparatus.

DETAILED DESCRIPTION OF AN EMBODIMENT

Figure 1A:
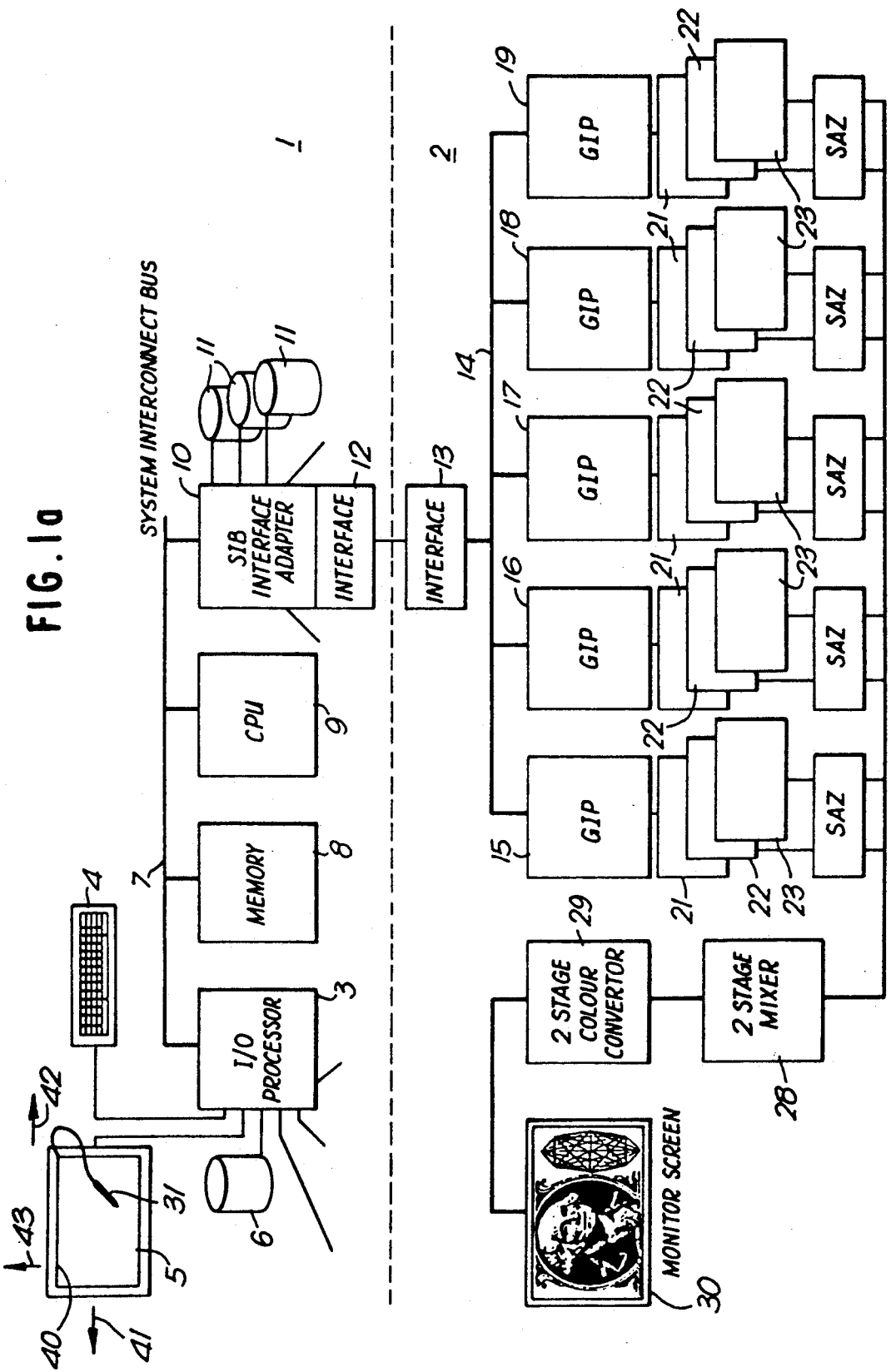
FIG. 1a and 1b are a block diagram of the apparatus and input device, respectively.

The apparatus shown in FIG. 1 can be divided into two primary parts. These comprise the host 1 and the graphics sub-system 2. The division is shown in FIG. 1 by a dashed line. The host 1 is a 68020 microprocessor based system running UNIX which is a multi-tasking, multi-user operating system. The host comprises an I/O processor 3 coupled to a keyboard 4, a digitizing tablet 5 and associated pen 31, a system disk 6 and other data sources (not shown). The I/O processor 3 is connected to a system inter-connect bus (SIB) 7 which is connected to ROM and RAM memory 8, a CPU 9, and an interface adapter 10. The interface adapter 10 is connected to a number of high speed image discs 11 which hold data defining the colour content of pixels of images at high resolution, the adapter also being connected via an interface 12 with the graphics sub-system 2. As mentioned above, the host has a conventional form and will not be described in detail. However, the SIB 7 is described in more detail in EP-A-0332417.

The programme that runs on the host is a single "process" which reads and processes inputs from the digitizing tablet 5 under operator control and directs the graphics part 2 to display the host's responses to those inputs on the graphics monitor 30. Essentially, the system takes advantage of the host system in being able to perform a majority of the calculations so that only a small amount of control data is passed to the graphics sub-system. This graphics part 2 is much better than the host 1 at creating and manipulating graphical objects but the host is better at controlling input/output to peripherals, discs and tapes and is relatively easy to programme.

The graphics sub-system 2 comprises an interface 13 which connects the graphics part to the host the interface 13 being connected to a bus 14. The bus 14 is connected to five graphics image processors (GIPs) 15–19. In this embodiment, it is assumed that the images are defined by four colour components, namely cyan, magenta, yellow and black, there being a separate GIP for each colour. Thus, the GIP 15 processes the cyan colour component, the GIP 16 the magenta colour component, the GIP 17 the yellow colour component and the GIP 18 the black colour component. If the image was represented by a different number of colour components, for example red, green and blue then only three of the GIPs would be needed. The advantage of providing the GIPs 15–18 in parallel is that each component of each pixel in the image can be processed in parallel so that the overall processing time is reduced by up to four times over the processing time with a single processor. A further advantage of using the GIPs is that each has a bit-slice processor on which the programmer can define instructions useful for a particular application.

A fifth GIP 19 is provided for defining one or more masks and other features.

Figure 1B:
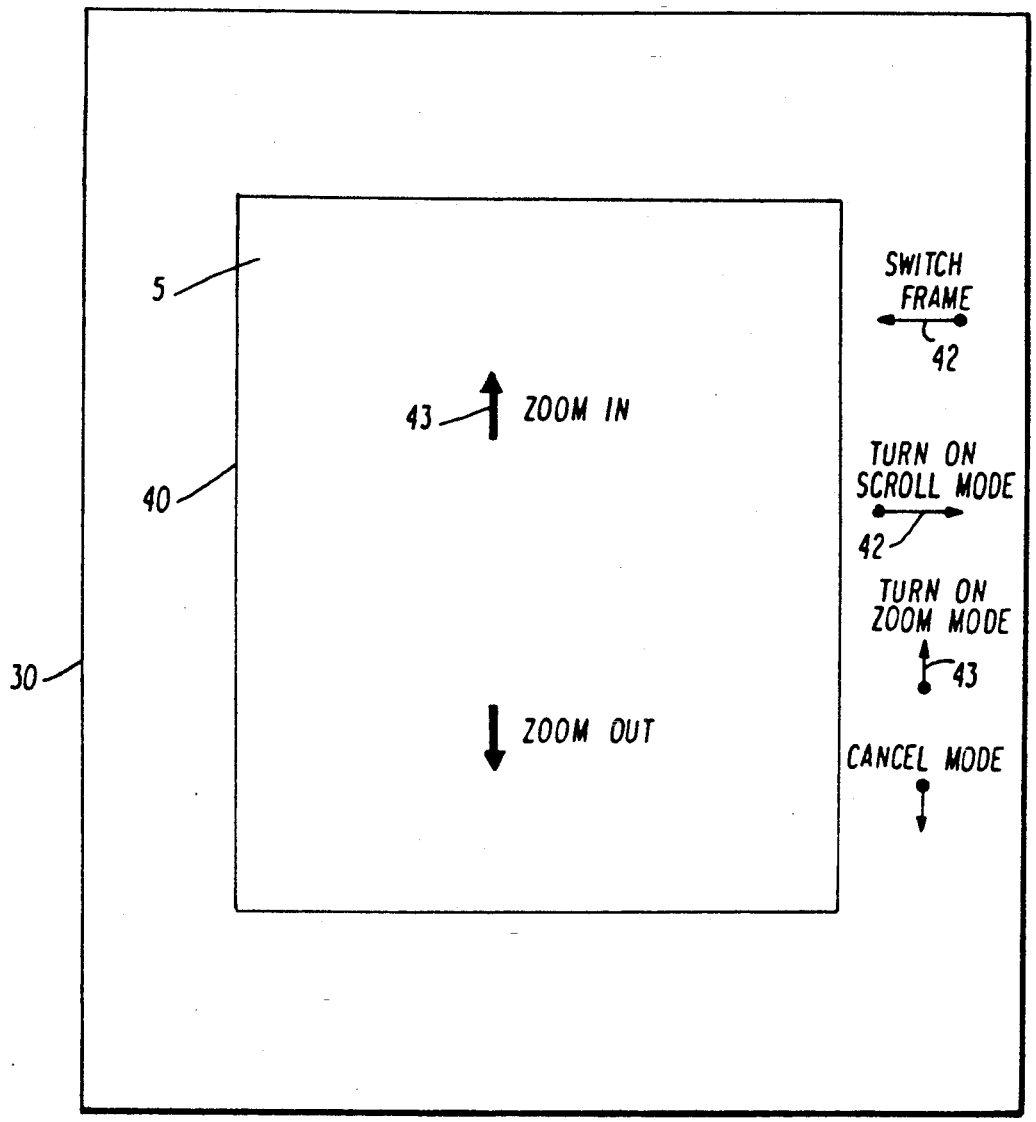
Figure 2:
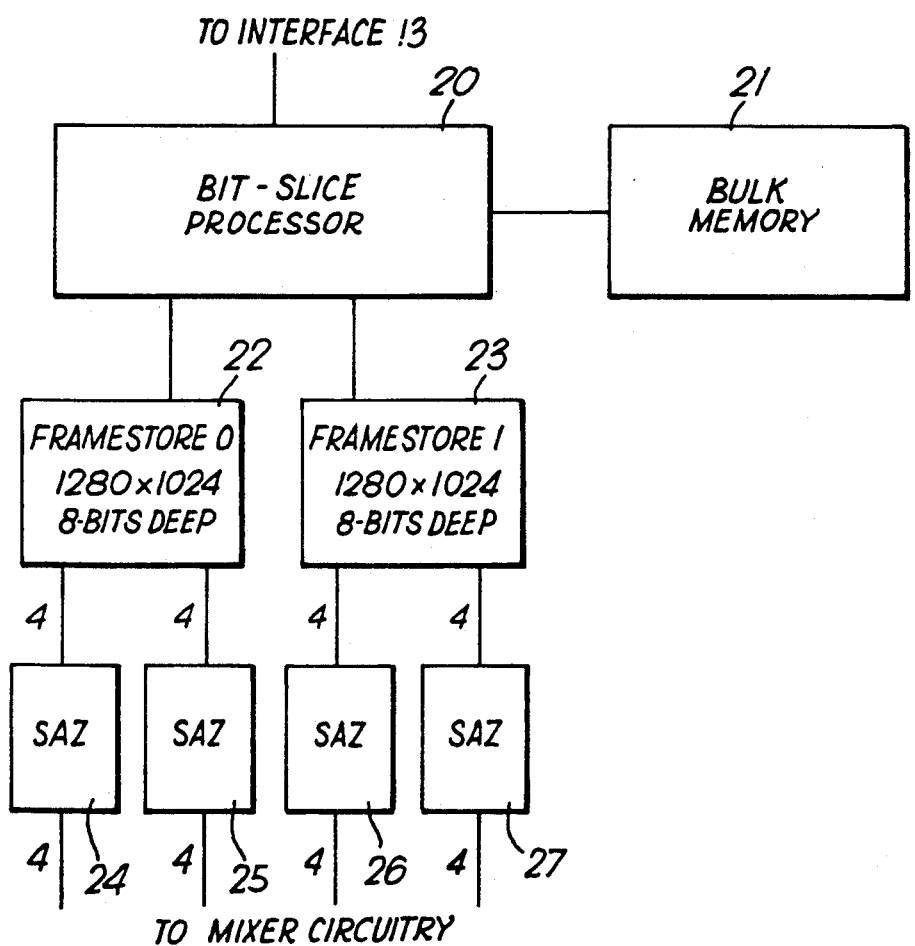
FIG. 2 is a block diagram of the graphics image processor of FIG. 1.

The construction of one of the GIPs of FIG. 1 is shown in FIG. 2. Each GIP comprises a bit-slice processor 20 coupled to bulk memory 21. This memory 21 will hold image data, brush profiles and text as required and is used as virtual image memory.

The bit-slice processor 20 is also connected to a pair of framestores 22, 23 each of which has dimensions 1280×1204 and is 8 bits deep. In the GIPs 15–18, each framestore will hold 8 bit colour data while in the mask GIP 19 each framestore can be used to hold 8 bit masks or two separate 4 bit masks. Furthermore, one of the framestores in the GIP 19 can be used to display menus in one four bit plane and overlays in the other four bit plane. Overlays comprise construction lines and boxes and the like which are to be displayed on the monitor.

The eight bit data in each framestore 22, 23 is applied in four bit "nibbles" to respective scroll, amplify and zoom circuits 24–27 which operate in a conventional manner to perform one or more of the functions of scroll, zoom and amplify, the outputs from these circuits being fed to a mixer circuit 28. The circuit 28 mixes the data from each of the framestores 22 associated with the GIPs 15–18 with the data from each of the frame stores 23 associated with the GIPs 15–18 in accordance with the mask stored in the framestore 22 of the GIP 19. This mixer circuit which operates in two stages is described in more detail in EP-A-0344976.

The output from the mixer circuit 28 is fed to a two stage colour converter 29 which converts the four colour component data to three colour component data e.g. red, green and blue suitable for controlling the display on a monitor screen 30.

In use, images are stored on the high speed image disks 11 and these images may have been generated by scanning original transparencies or other representations or they may have been created electronically using an electronic paint brush. The host causes relevant portions of these images to be "paged" in and out of the bulk memory 21 in the GIPs 15–18 and brush profiles to be loaded and unloaded from the bulk memory 21 in the GIP 19. The interface adaptor 10 has its own 68020 processor to allow it independently to control the disks 11. The GIPs 15–18 are directed by the host 1 to do various things to images in the bulk memory 21 so that when a GIP attempts to access an address in an image that is not currently in its bulk memory then part of that memory is written back to disc and a new portion read in. After the GIPs have finished processing, the data in the framestores is then scrolled, zoomed and/or amplified as necessary, mixed in the circuit 28, converted to monitor format and then displayed.

If the host 1 wishes to display menus on the screen, these are drawn into the mask GIP framestore 23, known as the "overlay plane". In operation, an image is created by the operator moving the pen of indicating device 31 across the digitizing tablet having specified certain initial parameters such as "brush" size, colour and the like stored in the bulk memories 21. The host monitors the position of the indicating device 31 relative to the digitizing tablet 5 so as to generate for each position an image pixel containing digital data defining that colour. This data is stored in the bulk memories, and the contents of the bulk memories are downloaded into the framestores 22. The framestores 22 define those pixels which are to be displayed on the monitor 30.

The area of the digitizing tablet 5 which corresponds to the outer boundary of the monitor 30 is indicated by a line 40 as shown in FIG. 1b. While the indicating device 31 remains within the border 40, the host 1 will create or modify the image in a conventional manner (electronic brushing step 60 (FIG. 3)). However, throughout this operation, the host 1 monitors (step 61) the co-ordinates of the indicating device 31 and if it detects that the indicating device 31 is no longer within the border 40 it then determines in which direction the indicating device 31 has been moved to arrive at its current position.

In a first step, the host 1 determines whether the indicating device 31 has been moved to the left (step 62) as indicated by an arrow 41 in FIG. 1. If it has then the host 1 causes the mixer circuit 28 to pass data from the framestore 23 to the monitor 30 so that another image (e.g. a background frame) is then displayed on the monitor 30 (step 63).

If movement of the indicating device was not to the left, the host 1 then determines whether the movement was to the right, in the direction of the arrow 42 in FIG. 1 (step 64). If rightward movement is detected this indicates that the scroll operation is required and the host 1 then determines whether the indicating device 31 has returned within the border 40 and is being pressed against the tablet 5 with sufficient pressure (step 65). The co-ordinates of this initial position are determined (step 66) and then during subsequent movement of the pen 31, the co-ordinates of the device relative to the tablet 5 are read (step 67) and the image is caused to scroll around the screen with the displayed cursor corresponding to the indicating device position remaining in the same place relative to the image. The host 1 continues to monitor the applied pressure and while the pressure remains above the threshold, new co-ordinates continue to be read and scrolling effected. When liftoff is detected (step 68) the scroll function terminates and the host 1 returns to the electronic brushing mode (step 60).

It will be understood that a slight threshold pressure of the pen or indicating device 31 is necessary to activate scrolling so that the user may avoid unintentionally causing a scroll while positioning the pen. Liftoff in step 68 may be detected if the host 1 detects no activity after a certain period, for example 1 second.

If the indicating device 31 causes the cursor to reach the edge of the monitor screen during scroll movement the scroll operation stops but can be reinitiated with a further swipe-right.

The host 1 also has to take account of the possibility that the image displayed has already been zoomed. The zoom factor is taken into account by the SAZ circuits 24–27. Thus, if the image has not been zoomed, dragging the pen and image through, say, half a screen distance will cause half the image in the framestores to be viewed. However, if the image has been zoomed by say 4 times dragging across half a screen will only need data corresponding to ⅛ of a screen.

In a variation of this process, an area of the digitizing tablet 5 could be set aside for handling scroll movement. That is, once the indicating device or pen 31 is in this "scroll area" the image will continue to scroll in the direction dependant on the particular area the pen was in until the pen was swiped-off or returned to the active area. Again, the previous working mode would be restored if the pen was returned to the main area of the tablet within the border 40. Pen pressure could be used to determine the speed of scrolling with a short prior movement of the pen indicating scroll direction.

If swipe-right is not detected in step 64 then in a step 69 it is determined whether an upwards swipe in the direction of an arrow 43 has occured. If it has then the host 1 enters the zoom mode. Once the zoom mode has been selected (FIG. 1b) the pen 31 is returned to the active area within the border 40 and the host 1 determines when some pressure threshold has been exceeded (step 70) to read the initial co-ordinates of the pen (step 71). These co-ordinates define the zoom centre. The zoom factor is determined in accordance with subsequent movement of the pen as detected in a step 72. Thus, the zoom factor will increase as the pen 31 is pushed up the tablet 5 (direction 43), and decrease as it is moved down. The zoom factor is communicated by the host 1 to the SAZ circuits 24–27. Release of pressure (as detected in a step 73) will quit zoom after 1 second and restore the previous working mode. Alternatively, a second swipe-right will cancel the working mode.

As an alternative to moving the pen in order to determine the zoom factor, this could be determined in accordance with the time during which the pen is applied again against the tablet 5 above a certain threshold pressure. Furthermore, the pressure could be monitored to alter the rate at which zooming occurs so that the harder the pressure, the faster the image zooms until maximum zoom is reached and the zoom process is cancelled and restarted from a factor of 1.0. The direction of zooming could be reversed by a lift-off and then reapplication of the pen.

In a further modification (not shown) the zoom and scroll features could be combined into a single action following a swipe-right. In this case, the "sticky pen" concept will control scrolling action as before, and when the pen pressure is increased beyond some threshold, zooming occurs.

Referring to FIG. 3, if a swipedown is detected (step 74) then this can be used to cancel the working mode and allow use of a new menu, for example by displaying the menu. (step 75).

Finally, if none of the conditions tested in steps, 62, 64, 69 and 74 is detected, an error condition is indicated (step 76).

I claim:

1. Image handling apparatus comprising a store for storing digital data defining an image; a monitor connected to the store for displaying the image according to one of a plurality of display modes; control means for controlling the image display in accordance with a selected one of said display modes; and indicating means including a position defining means defining a monitor display defining area corresponding to the area of the image displayed on the monitor and an indicating device moveable across the position defining means, the indicating means determining the position of the indicating device relative to the position defining means to indicate corresponding parts of the displayed image, wherein movement of the indicating device relative to the position defining means causes the displayed image to vary in accordance with the selected display mode, the type of variation within the selected display mode being dependent on the direction of relative movement between the indicating device and the position defining means, and wherein the control means is responsive to movement of the indicating device beyond the monitor display defining area of the position defining means in any one of at least two directions to select one of said display modes according to the direction of movement of the indicating device, each of said at least two directions corresponding to a different one of said display modes, such that the same relative movement of the indicating device relative to the position defining means within the monitor display defining area will cause different variations in the displayed image in accordance with the selected display mode.

2. Apparatus according to claim 1, wherein said plurality of display modes comprises one of scroll, zoom, and a switch between the image displayed.

3. Apparatus according to claim 2, wherein the control means can actuate a scroll mode, the control means causing the scroll movement to correspond to subsequent movement of the indicating device across the position defining means.

4. Apparatus according to claim 2, wherein the control means can actuate a zoom function, the control means monitoring subsequent movement of the indicating device or the length of time the indicating device is applied subsequently to the position defining means to determine the degree of zoom.

5. Apparatus according to claim 2, wherein the control means can actuate a zoom function, the zoom factor varying at a rate which is dependent upon the pressure with which the indicating device is applied to the position defining means.

6. Apparatus according to of claim 2, wherein part the position defining means is set aside as a scroll region, the indicating device being moved within the scroll region upon initiation of the scroll mode to indicate the degree of scroll required.

7. Apparatus according to claim 1, wherein the position defining means is a digitizing tablet and the indicating means is a digitizing pen.

8. A method of image handling comprising the steps of storing digital data defining an image; defining an area corresponding to an area of the image on a monitor; displaying the image in accordance with a selected display mode in the defined area; moving an indicating device within the defined area to cause the displayed image to vary in accordance with the selected display mode, the type of variation within the selected display mode being dependent on the direction of relative movement between the indicating device and the defined area, and moving the indicating device beyond the defined area in any one of at least two directions to select a different display mode according to the direction of movement of the indicating device, each of said at least two directions corresponding to a different display mode, such that the same relative movement of the indicating device within the defined area causes different variations in the displayed image in accordance with the selected display mode.

* * * * *